Dec. 21, 1965 ISAO OISHI 3,224,694
AUTOMATIC COP FEEDER
Original Filed Aug. 24, 1962 15 Sheets-Sheet 3

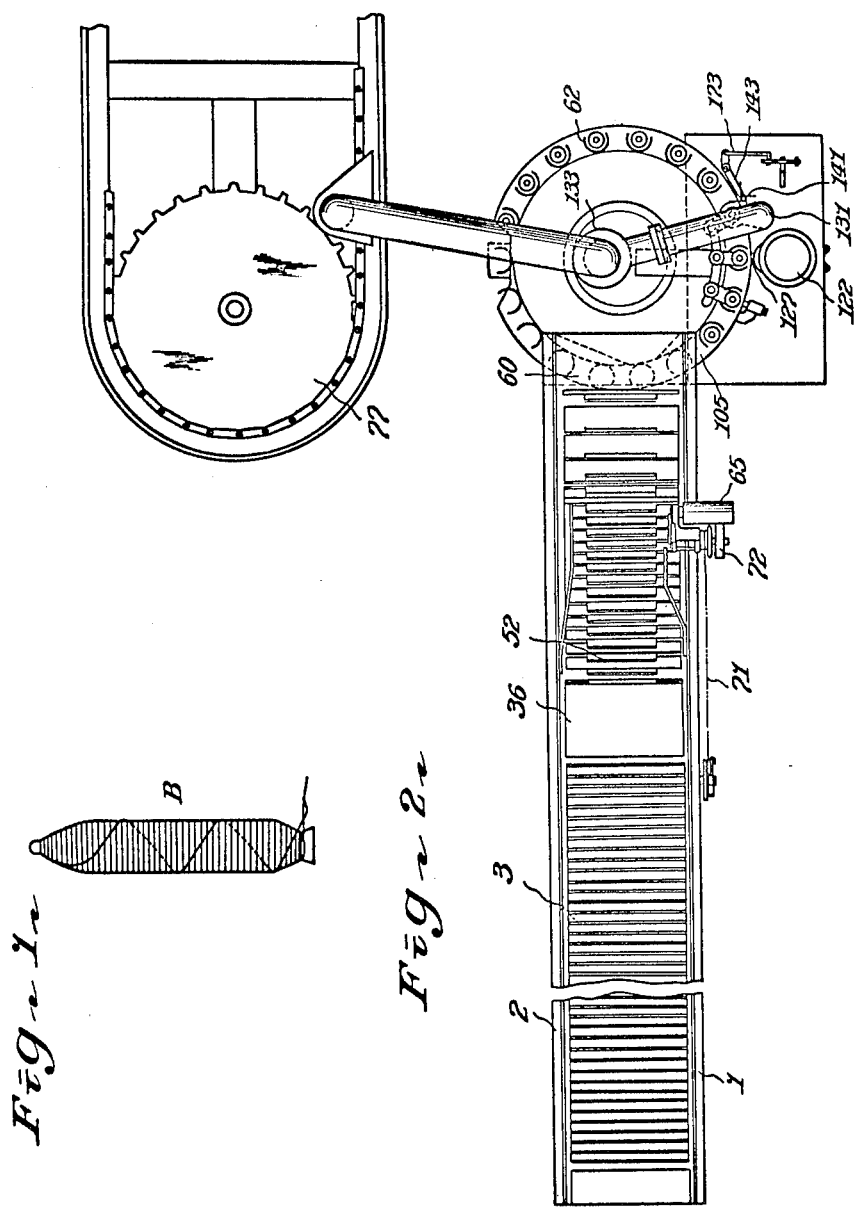

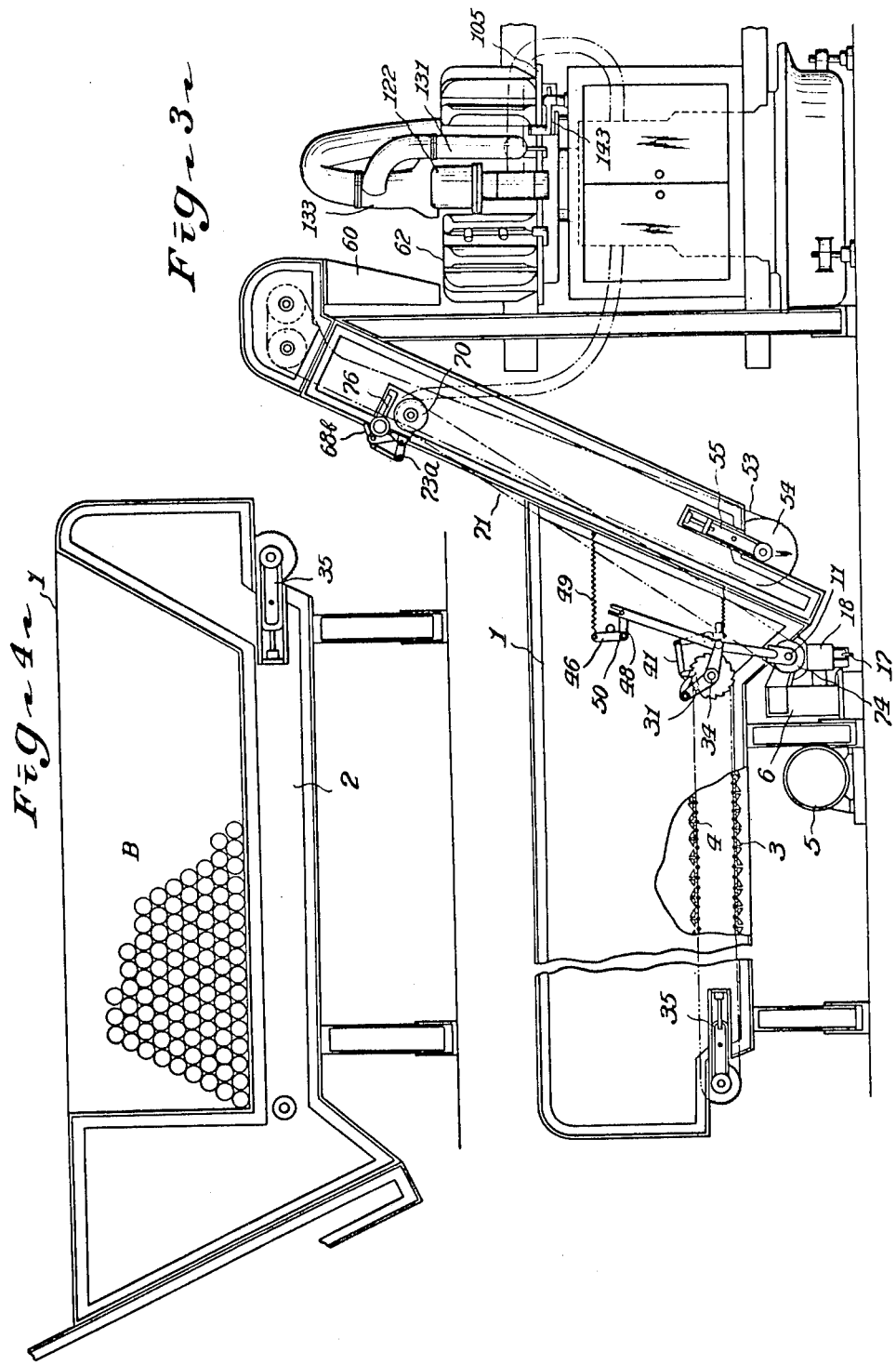

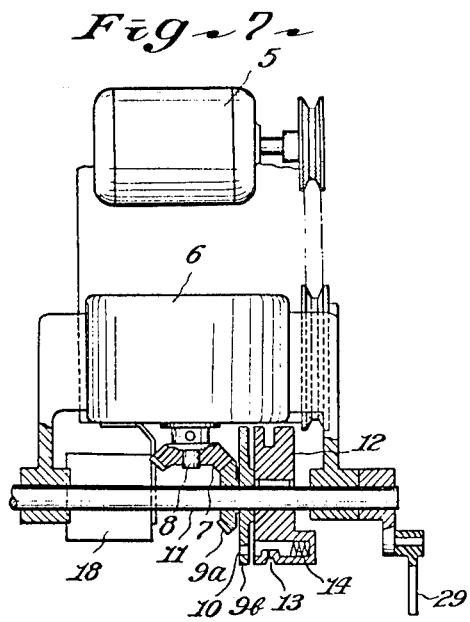
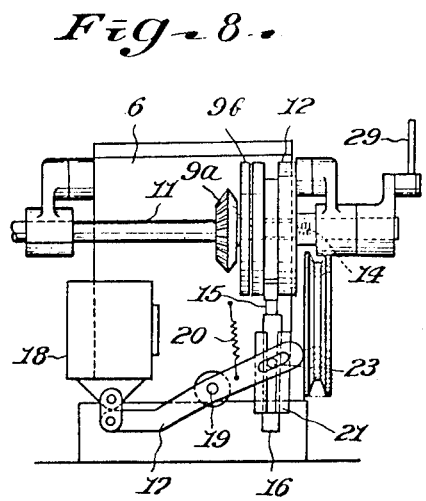
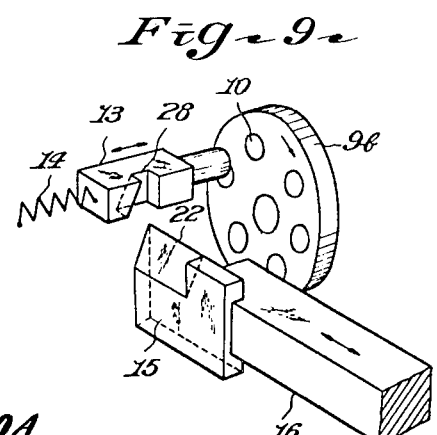
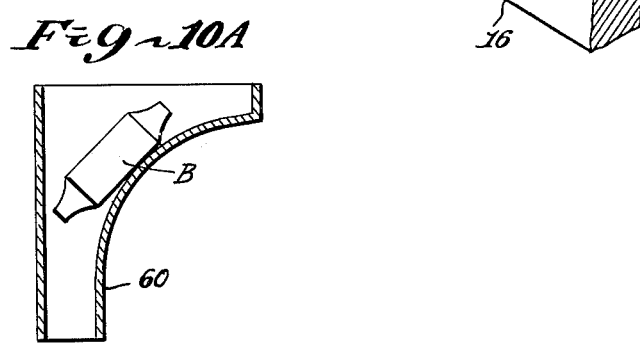

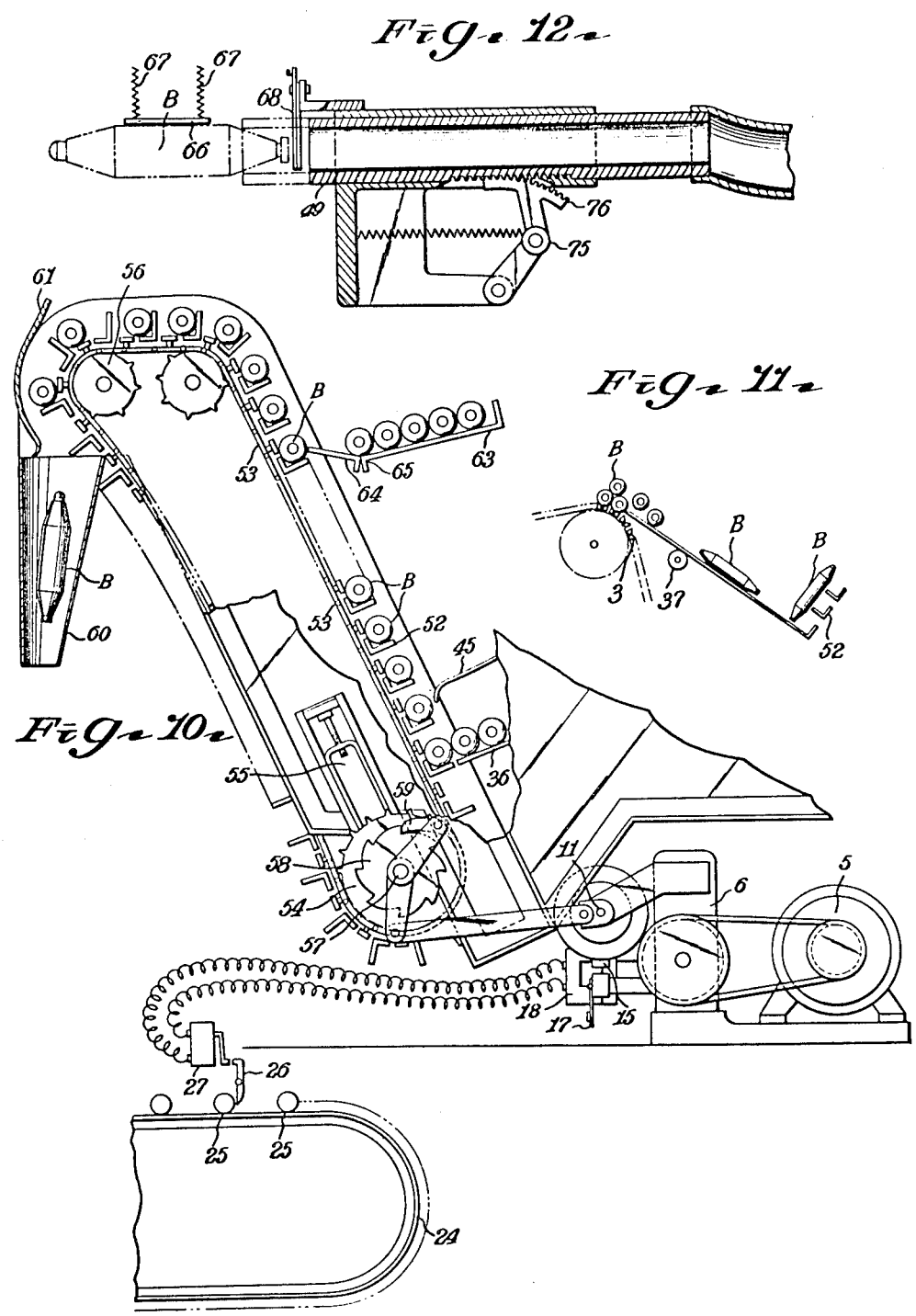

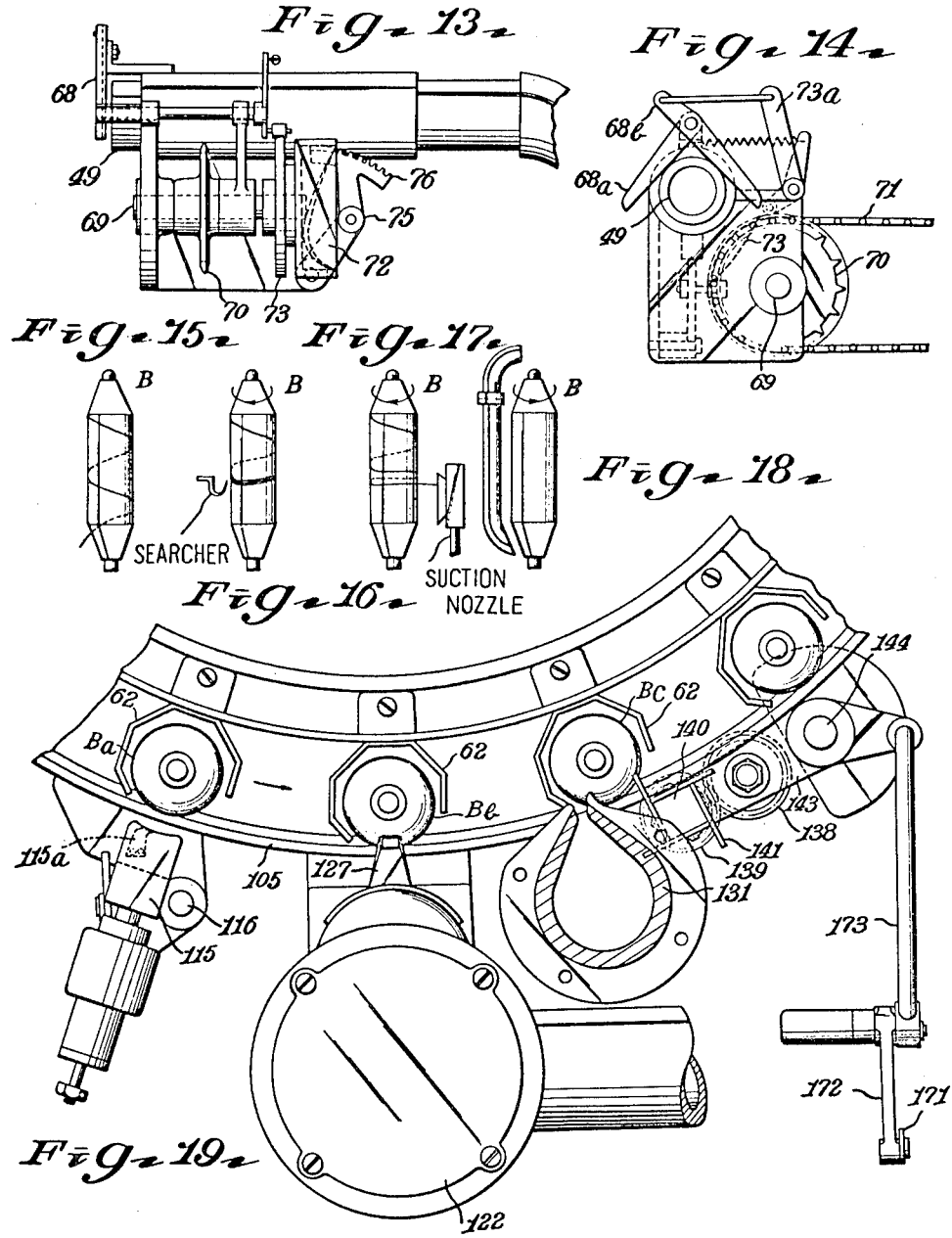

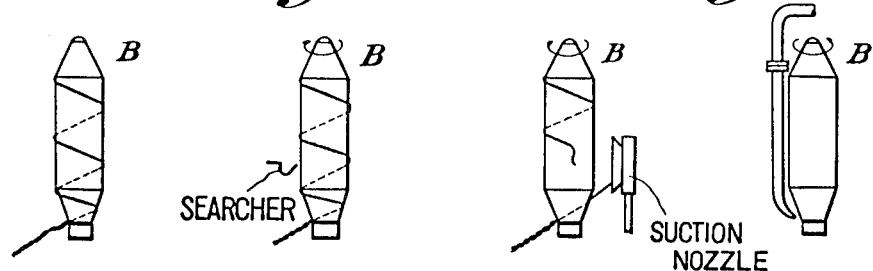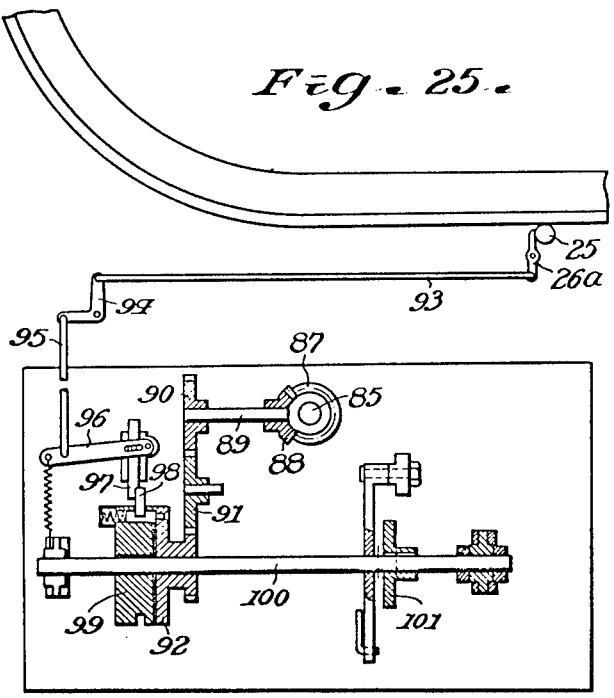

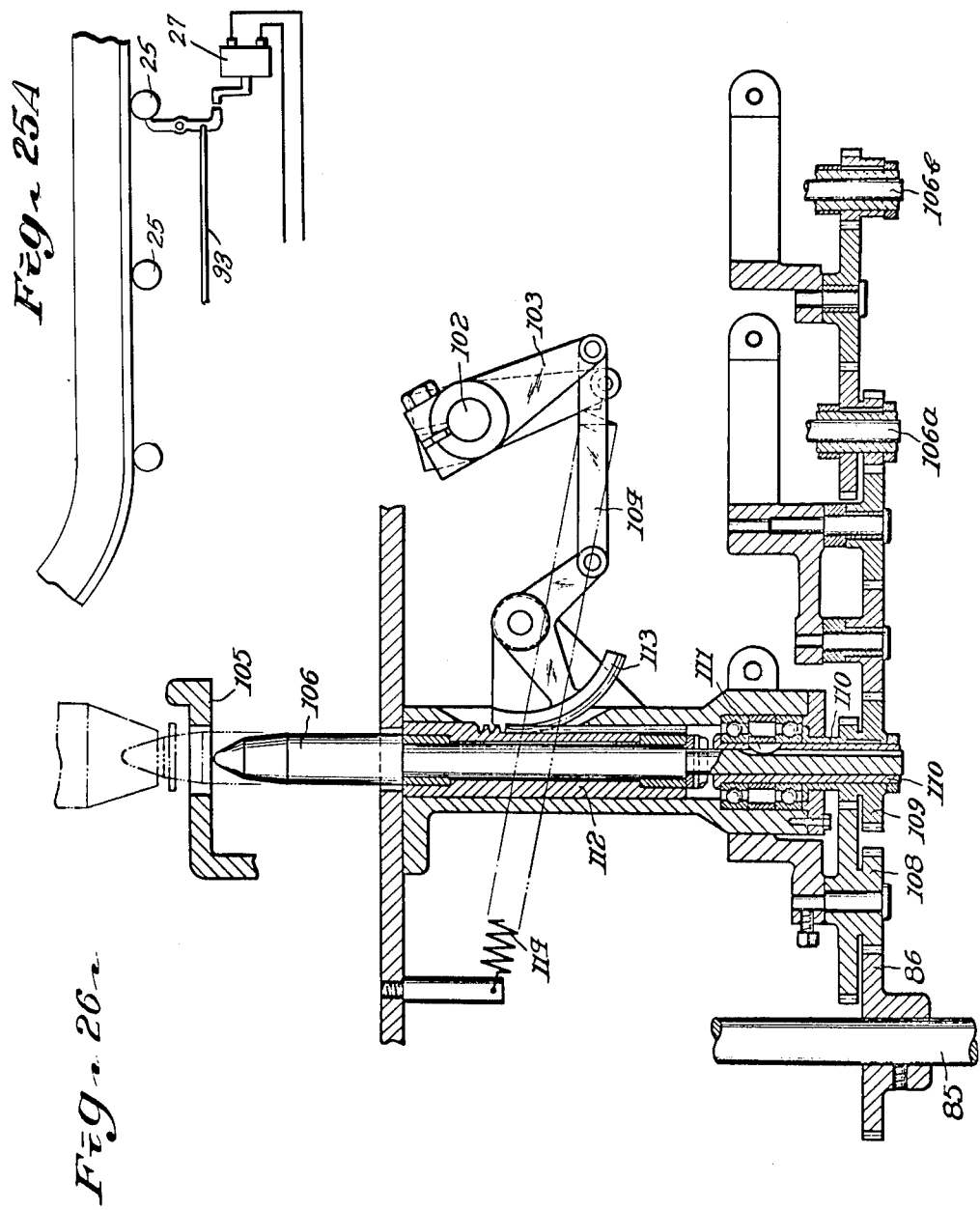

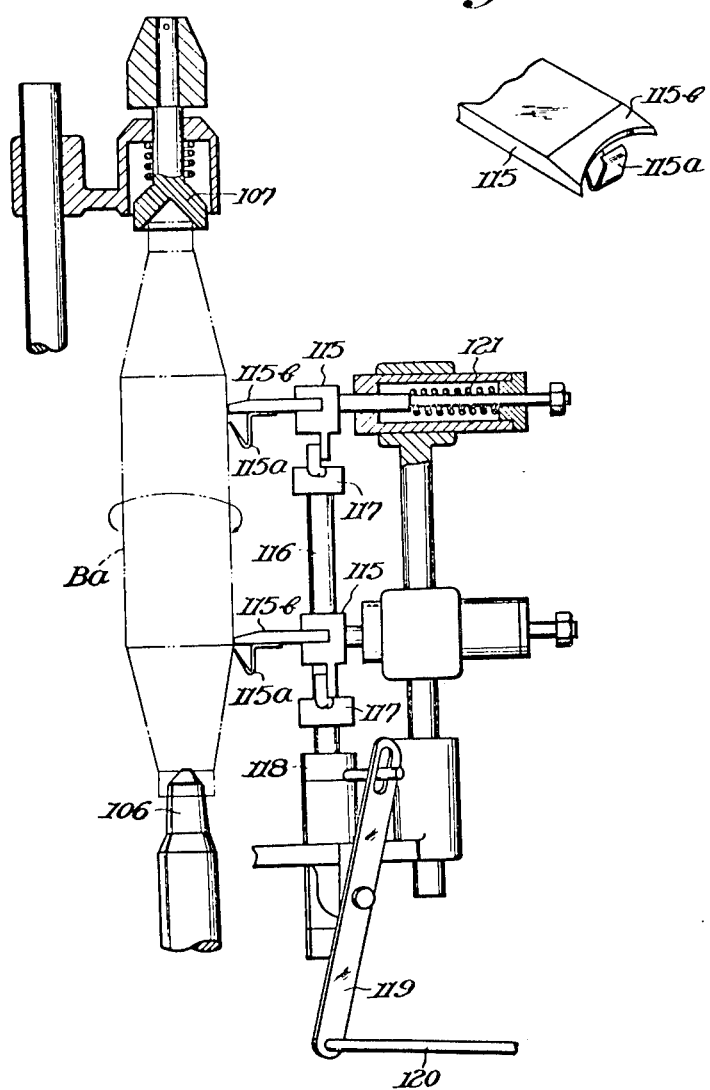

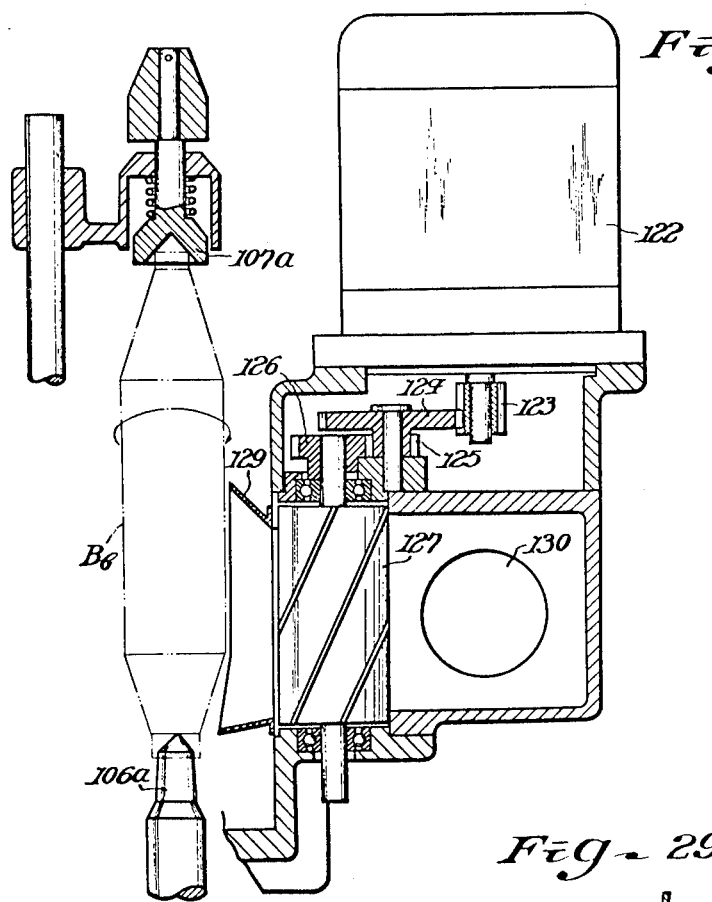
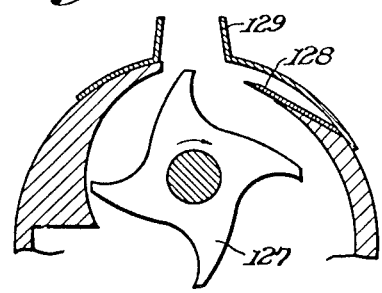

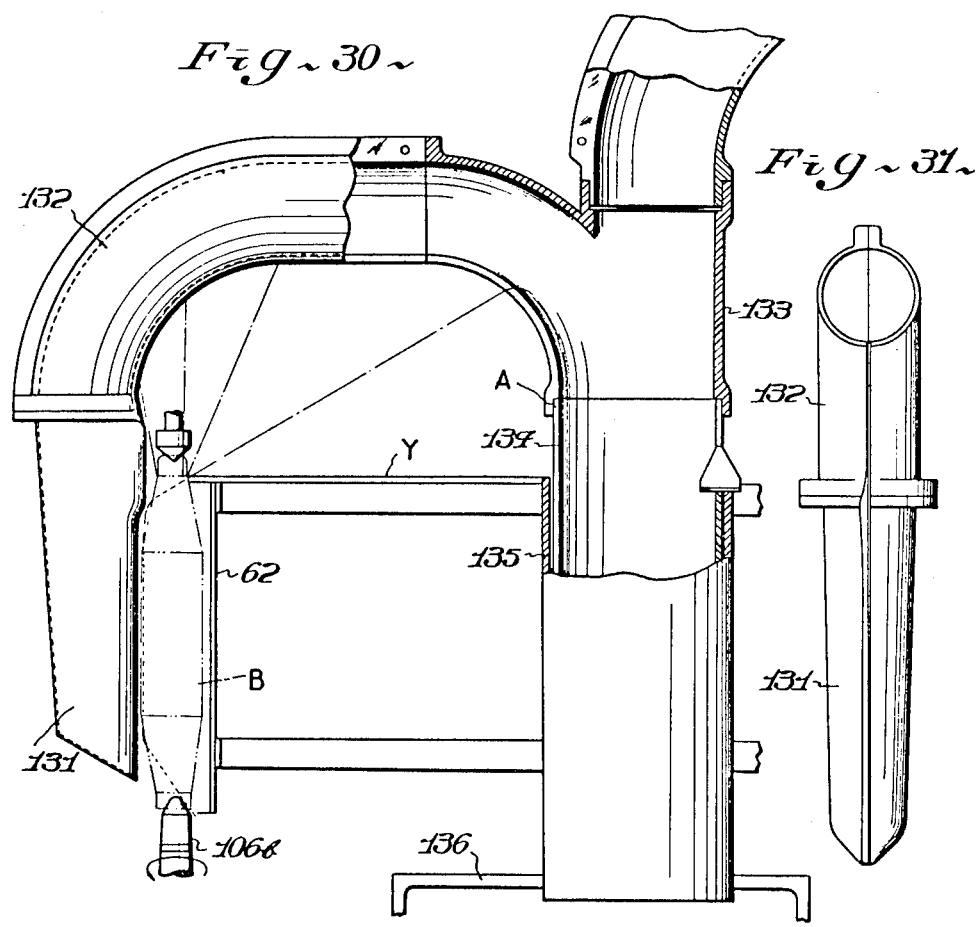
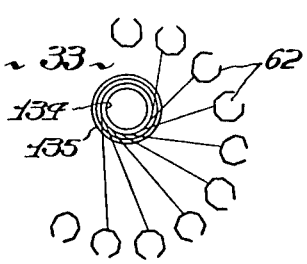
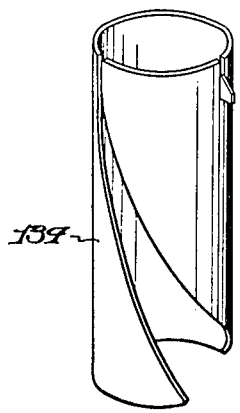

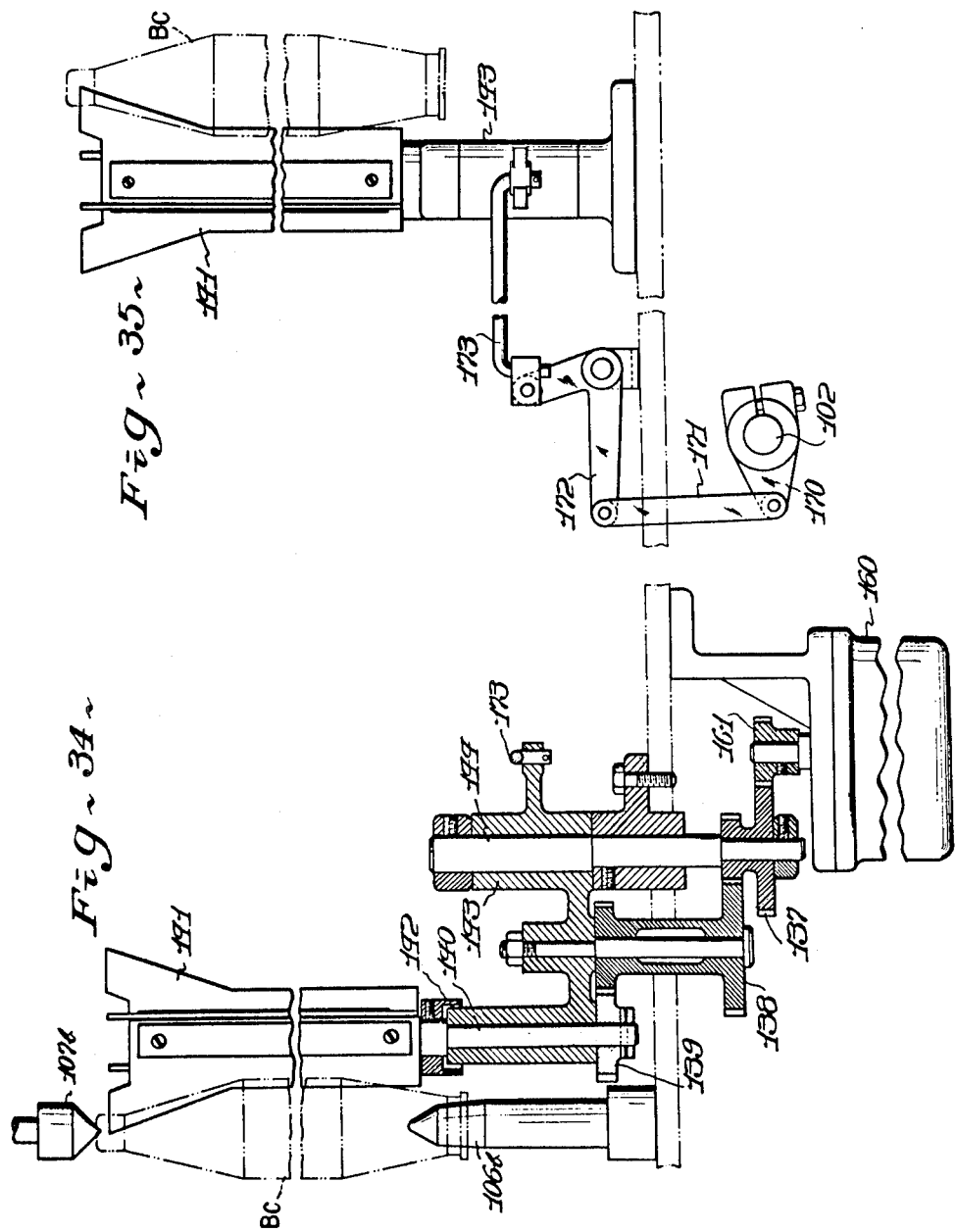

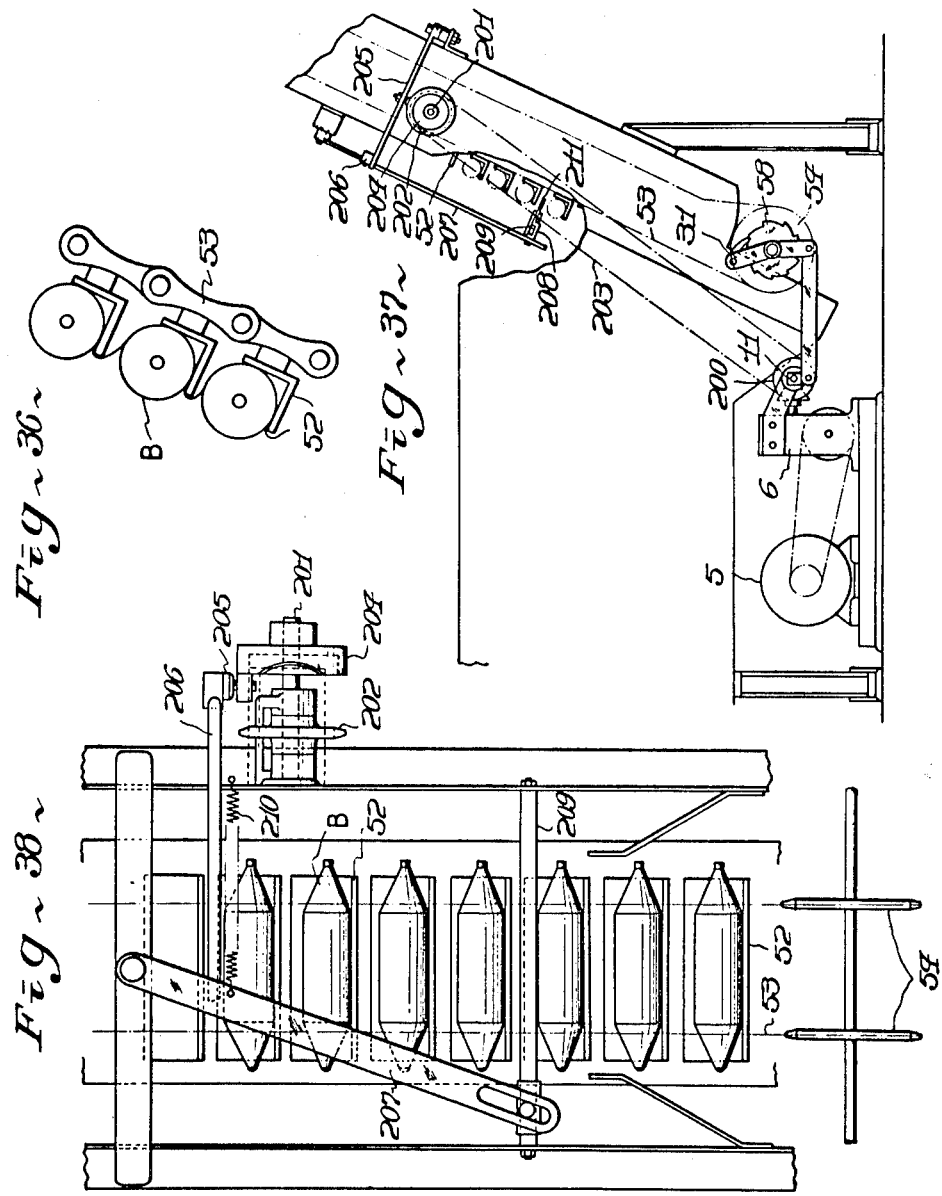

Dec. 21, 1965 ISAO OISHI 3,224,694
AUTOMATIC COP FEEDER
Original Filed Aug. 24, 1962 15 Sheets-Sheet 15
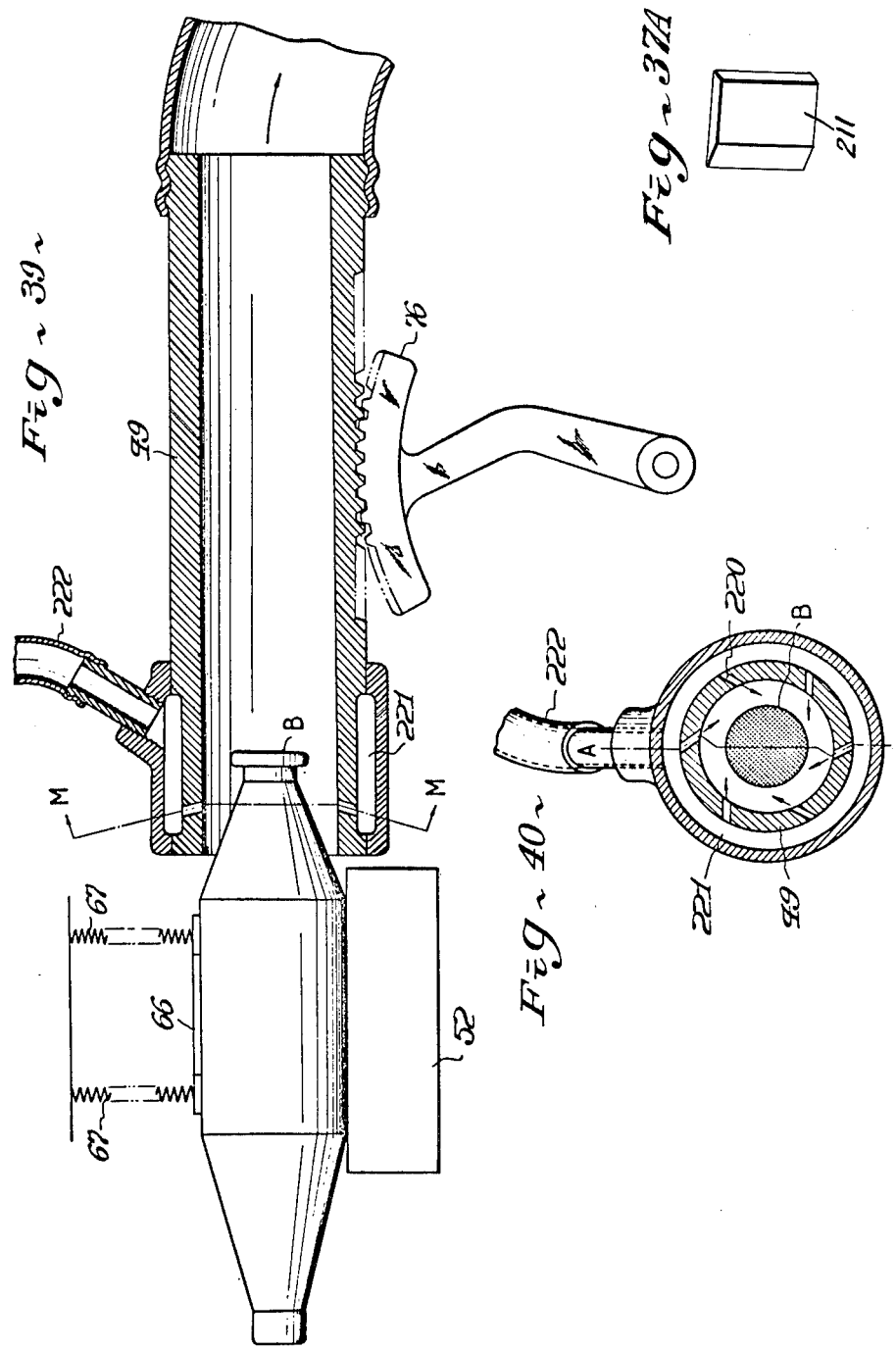

United States Patent Office 3,224,694
Patented Dec. 21, 1965

3,224,694
AUTOMATIC COP FEEDER
Isao Oishi, Kyoto-shi, Japan, assignor to Murata Kikai Kabushiki Kaisha, Kyoto-shi, and Toyo Boseki Kabushiki Kaisha, Osaka-shi, Japan, both joint-stock companies of Japan
Continuation of application Ser. No. 219,262, Aug. 24, 1962. This application Feb. 19, 1965, Ser. No. 434,055
Claims priority, application Japan, Sept. 11, 1961, 36/46,553; Dec. 14, 1961, 36/62,003; Jan. 22, 1962, 37/1,782; Feb. 26, 1962, 37/9,223
23 Claims. (Cl. 242—35.5)

This invention relates to automatic cop feeders and is a continuation of my application for U.S. Patent, Serial No. 219,262 filed August 24, 1962, now abandoned. More specifically, the invention relates to an apparatus for automatically feeding fresh supply bobbins (hereinafter called bobbins) to a supply magazine for a winder of the type having a plurality of winding mechanisms, for example, which supplies new bobbins at a certain position in the circular track of an Abbott type winder, that is, a winding unit which travels along a circular track, shown in U.S. Patent No. 2,177,763.

In the well known Abbott winder as shown in that patent, the circular track carrying the plurality of moving winding mechanisms for unwinding thread from bobbins and winding it onto packages, such as cheese, is provided with a bobbin removal station in advance of a bobbin transfer station with bobbins conventionally being removed at such removal station in the absence of a thread unwinding from the bobbin onto the package, either because the bobbin is exhausted or the thread has broken. For supplying a wound bobbin to a winding mechanism from which a bobbin has been removed, there is provided a rotary bobbin supply magazine supporting a plurality of angularly spaced wound bobbins for automatic advance and transfer to a winding mechanism in response to an appropriate signal. Although there is conventionally provided a thread uniting knotter adjacent the transfer station and a suction tube for delivering a package thread end thereto for uniting a package thread to a thread from a wound bobbin on the magazine, it is necessary in the conventional Abbott winder for the operator not only to keep the rotary magazine supplied with wound bobbins, but to free the individual bobbin thread ends for delivery to the knotter. Particularly with bobbins having easily broken yarn, such as yarn with many slubs, a relatively large amount of operator time and skill is needed to keep the rotary magazine supplied with full bobbins having free ends ready for delivery to the knotter so that the winder is kept full of unwinding bobbins.

Attempts have, of course, been made to provide a practical truly automatic system incorporating full bobbin feeding and end finding in order to relieve the operator of these tasks.

Winders having such feeding mechanisms are known through such sources as U.S. Patent No. 2,675,971, but such mechanisms proposed heretofore have various disadvantages, the principal of which are listed below:

(1) Since the bobbins are fed by placing the same at random into a box-shaped hopper, jamming of the bobbins or shut out bobbins within the hopper often occurs.

(2) Since the apparatus for horizontally conveying the bobbins is of the continuous feed type, and since a flat belt is used, the bobbins become disarranged at the part where they move onto an elevating conveyor.

(3) Because, after a bobbin is inserted into a supply peg of the winder, the bobbin is caused to rotate together with the peg, the deflection of the bobbin becomes large. Consequently, the searcher tends to bite into the bobbin, and in many cases the searcher fails to cut the doffing coil. As a result, the bobbin separates from the nozzle, the suction of the thread becomes poor, and since the bobbin does not rotate when it contacts the nozzle, defective suction action aften occurs.

(4) Since a beater is not provided, the suction action in the case of thread having fluff is poor.

(5) The last wound thread remains and causes thread break back in the winding.

Because of such disadvantages as listed above, the aforementioned cop-feeding mechanisms of known design are difficult to use in practice.

It is, therefore, a general object of the invention to provide a new automatic cop feeder in which such disadvantages as described above are eliminated, and highly desirable features for practical use, as will be described hereinafter, are incorporated.

According to one major aspect of the invention, said general object is accomplished by providing wound bobbin thread end finding means at a thread end operating station remote from the bobbin transfer station, together with means for delivering the found end to the thread uniting means, and means for delivering bobbins to the thread end finding station and thereafter to the transfer station.

Briefly described, the automatic cop feeder according to the present invention is composed of a bobbin reservoir section for placing bobbins in a row and supplying the same, a bobbin replenishment means functioning as a magazine section wherein packages and thread ends of the bobbins are automatically joined and the bobbins are fed to a winder, and an elevating conveyor which connects the above mentioned sections. In addition, as a major aspect of the invention, the automatic cop feeder thereof is preferably provided with a series of thread end operating mechanisms at a plurality of thread end operating stations disposed about the circular track of the magazine for searching out the thread ends of the bobbins and leading such ends to a suction pipe for delivery to the thread uniting means.

The bobbin reservoir section for placing the bobbins in a row and supplying the same is in the form of a horizontal conveyor, which is so adapted that when bobbins are placed thereon in a row, the bobbins are conveyed to conveying slats of an elevating conveyor.

The elevating conveyor consists of a plurality of slats, each of which holds and conveys one bobbin, and is arranged for intermittent elevating movement in synchronism with the rotary magazine to supply a bobbin to the magazine filling means to drop it into the bobbin supply station of the magazine.

In the part where the bobbins are transferred from the horizontal conveyor to the slats of the elevating conveyor, a lever type chute is provided to function as a bridging means between the horizontal conveyor and the slats. The chute is so adapted that, when a bobbin is transferred from the horizontal conveyor to a slat, and the weight of the extreme end of the lever type chute becomes lightened, the horizontal conveyor is caused to move a distance corresponding to one bobbin.

The driving of the conveyors is accomplished with interrelation to the driving means for circulating the winding units. The driving of the magazine is accomplished through the engagement between the travelling winding units and the magazine. Accordingly, if for some reason there is a part where a winding unit is missing, the drive of the conveyors will be continued in spite of the stopping of the rotation of the magazine, and the bobbins will be dropped into the magazine cans. Since two or more bobbins will then be dropped into one magazine can, the elevating conveyor is so designed that each time the conveyor moves intermittently, a bobbin is dropped into a magazine can.

Furthermore, a spare bobbin box is disposed in the vicinity of the elevating conveyor, which is a continuous assembly of slats, so that when there are slats without bobbins, a swing plate which forms a door of the spare bobbin box is caused to swing and feed a bobbin to each empty slat, thereby ensuring that there are no slats without bobbins.

As the bobbins are conveyed, each bobbin rides on one of the slats which, in combination, form a stairway-like structure and the thread ends of these bobbins become unraveled and tend to extend over onto the adjacent slat. As a result, the bobbins are caused to fall off their slats, or the withdrawal of the thread ends is caused to become defective. In order to prevent this result, means are provided to cut the bobbin thread ends which straddle the adjacent slats.

A movable suction device for drawing in the last wound thread usually helically downwardly wound on each bobbin is so provided as to face the bottom or tail portion of the bobbin at its position prior to being dropped into the magazine. At the time when the bobbin has stopped moving, this device advances toward the tail portion of the bobbin, unwinds the thread end wound several times about the tail portion of the bobbin by means of a spiral flow of blown air, and draws in this thread end by means of a vacuum. At the same time, means for cutting the thread end to a suitable length is provided, whereby the thread end withdrawal within the magazine is facilitated.

After a bobbin has been fed into the magazine, it undergoes thread end withdrawal preferably in a series of operations carried out at a bobbin supply station at a plurality of spaced thread end operating stations. The first step of this thread end withdrawal is accomplished at a thread end searching station by a searcher, which advances toward the bobbin, catches the doffing coil of the bobbin rotating in the direction of winding of the thread, and rewinds the portion near the thread end loosely about the bobbin. In the case when the last wound thread has not been drawn in by the suction device, the searcher which has caught the doffing coil cuts this thread.

The second step of the thread withdrawal is carried out at a cutting station and comprises drawing in by suction the thread end which has been cut by the aforesaid searcher and cutting the same by means of a cutter.

The third step of the thread withdrawal is carried out at a thread end finding station and comprises beating out, by means of a rotating beater which is capable of being advanced toward or retracted from the bobbin, the thread end which has not yet been withdrawn and drawing in the thread end by means of a suction nozzle provided in proximity to the bobbin for delivery to the thread uniting knotter.

The details of the invention as well as the manner in which its objects and advantageous features may best be achieved will be apparent by reference to the following detailed description of a representative embodiment of the invention when taken in conjunction with the accompanying illustrations of this invention in which like parts are designated by like reference numerals and letters, and in which:

FIG. 1 is a side view of a supply bobbin;

FIG. 2 is a plan view showing the entire assembly of the embodiment of the invention;

FIG. 3 is a side elevational view, with parts cut away, showing the entire assembly of FIG. 2;

FIG. 4 is a side elevational view, showing one portion of the side opposite that shown in FIG. 3;

FIG. 7 is a plan view, partly in section, showing the details of one portion of the conveyor of FIG. 5;

FIG. 8 is an elevational view showing the details of one portion of the conveyor of FIG. 5;

FIG. 9 is a perspective view, showing one portion of the conveyor of FIG. 5;

FIG. 10 is a side elevational view, with parts cut away and partly in diagrammatic form, showing an elevating conveyor of the embodiment;

FIG. 10A is a side view partly in cross-section of the elevating conveyor.

FIG. 11 is a diagrammatic side elevational view indicating a condition wherein a bobbin descends lengthwisely along a chute plate;

FIG. 12 is an elevational view, partly in section, showing a device for sucking in the thread ends of bobbins;

FIG. 13 is an elevational view showing a power transmitting mechanism for the device of FIG. 12;

FIG. 14 is a side elevational view of the mechanism of FIG. 13, and the said view being an orthogonal projection of the view of FIG. 13;

FIGS. 15 through 18 are elevational views indicating in operational sequence, a method of sucking a thread end in the case in which the last wound thread end is unwound;

FIG. 19 is a plan view showing thread end withdrawal according to the present invention;

FIGS. 20 through 23 are elevational views indicating an operational sequence, a method of sucking a thread end in the case in which the last wound thread is not unwound;

FIG. 25 is a plan view, in diagrammatic form, indicating the power transmission from an automatic winder of the embodiment;

FIG. 25A is a plan view, in diagrammatic form, illustrating the means for actuating the drive for the elevating conveyor;

FIG. 26 is an elevational view, in section, showing a mechanism for imparting rotation to a bobbin;

FIG. 27A is a side elevational view, partly in cross-section, of a searcher according to the invention;

FIG. 27B is a view in perspective showing the combination of the searcher knife and searcher guide shown in FIG. 27A;

FIG. 28 is an elevational view, in section, showing a thread end suction device;

FIG. 29 is an enlarged plan view of one portion of the device of FIG. 28;

FIG. 30 is an elevational view, with parts cut away and with some parts in section, showing a suction pipe suitable for use in the aforesaid embodiment;

FIG. 31 is an elevational view showing a slit in the pipe of FIG. 30;

FIG. 32 is a perspective view showing an inner tube of the suction pipe of FIG. 30;

FIG. 33 is a plan view showing the sucking in of thread ends in one part of the magazine;

FIG. 34 is an elevational view, partly in section, showing the power transmitting mechanism of a beater;

FIG. 35 is an elevational view showing a mechanism for causing the beater to contact and separate from a bobbin;

FIG. 36 is a fragmentary elevational view indicating the state of bobbins riding on the slats of the elevating conveyor;

FIG. 37 is a side elevational view showing an unwound thread cutter of the embodiment;

FIG. 37A is a diagrammatic view showing one part of the sliding piece;

FIG. 38 is a plan view of the unwound thread cutter of FIG. 37;

FIG. 39 is an enlarged side elevational view, partly in section showing the details of a suction device for the last wound thread;

FIG. 40 is a sectional view taken along the line M—M of FIG. 39.

Figure 5:
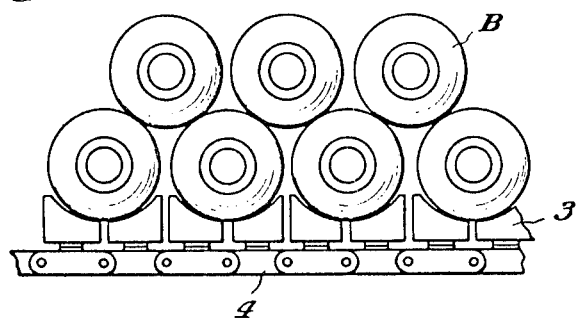
FIG. 5 is an enlarged side elevational view showing one portion of a horizontal conveyor of the embodiment.

Referring first to FIG. 1, after a bobbin has been wound in a spinning frame, its last wound thread end is wound spirally several times from the tip to the tail portion of the bobbin. Since this thread end becomes entwined with the underlying first wound thread at the tail portion of the bobbin, its mechanical withdrawal has heretofore been difficult. Consequently, the conventional practice has been to resort to hand work when drawing the thread ends from the bobbins and feeding these bobbins into the magazine pipes.

In an automatic cop feeder, by merely placing the bobbins in a row on a horizontal conveyor, the bobbins are automatically placed, one at a time, into the magazine, where they are automatically processed, and their thread ends are led into a thread holder (magazine pipe) by an air stream. FIGS. 2 and 3 are, respectively, plan and side elevational views showing the entire assembly of an embodiment of this feeder, in which the conveyor comprises side frames 1 and 2, lattice bars 3 forming the upper surface of the horizontal conveyor, and endless chains 4.

As shown in FIG. 4, the side frame 2 of the horizontal conveyor section is partly cut away so as to facilitate the placing of the bobbins, and the bobbins can be placed in a row in one fixed direction on the horizontal conveyor.

The horizontal conveyor has the capacity to contain several hundreds of bobbins and so function as a bobbin reservoir. The lattice bars 3 forming the upper surface of the hozional conveyor have concave surfaces so that bobbins B will be loaded on the conveyor in an orderly manner, in parallel alignment with equal spacing, whereby the bobbins are prevented from rubbing and damaging each other and from becoming crushed. The lattice bars 3 are connected at their ends to the endless chains 4, by which they are caused to convey the bobbins B.

The driving system of the horizontal conveyor, as shown in FIGS. 3, 6, 7, 8, and 9, derives power from a motor 5 which is installed below the horizontal conveyor and drives a speed reduction mechanism 6 by means of a V belt. Output shaft 8 of the speed reduction mechanism transmits power at reduced speed by way of a bevel gear 7 fixed to the shaft 8 and a bevel gear 9a meshing with the bevel gear 7 to cause a clutch plate 9b to be in constant rotation. The clutch plate 9b, which is supported on but is freely rotatable about a clutch shaft 11, is provided with twelve holes 10 arranged with their centers on a common circle near the periphery of the clutch plate.

In the clutch mechanism which includes the clutch plate 9b, as shown in FIG. 7, a key guide 12, which is fixed by means of a key to the clutch shaft 11, has a slot in one portion thereof, wherein a key 13 adapted to slide along this slot and a compressed spring 14 tending to thrust this key 13 outward are provided. Referring particularly to FIGS. 8 and 9, a key latch 15, which is fixed to a latch holder 16, is adapted to be slidable in the vertical direction, being guided by a latch guide 21. This key latch 15 has at its extreme forward end an inclined surface 22 as shown in FIG. 9, which surface fits into a slot 28 in the latch guide 21. The latch holder 16, as shown in FIG. 8, has a pin 23 fixed thereto which engages with a slot in a lever 17 pivoted on a pivot pin 19. The lever 17 is actuated by a solenoid 18 and in turn actuates the latch holder 16. A spring 20 (FIG. 8) is adapted to impart an upward force constantly on the key latch 15.

The solenoid 18 is electrically connected to a microswitch 27 which is disposed in proximity to an automatic winder, as shown in FIG. 10, and is actuated by a trip lever 26 which is so disposed as to be actuated by guide rolls 25 of the travelling units of the winder. When the travelling units move and one of their guide rolls 25, riding on rails 24 of the winder, contacts the trip lever 26, the microswitch 27 is actuated and in turn activates the solenoid 18, which in turn lowers the key latch 15.

When the key latch 15 is lowered, it disengages from the slot 28 of the key 13, whereupon the key 13 is thrust out by the spring 14 and enters one of the aforementioned holes 10 in the clutch plate 9b whereby the clutch shaft 11 and the clutch plate 9b are locked so as to rotate together.

By the time the clutch shaft completes one revolution, the guide roll 25 which has been contacting the trip lever 26 disengages from this lever, whereby the current flowing in the solenoid 18 is cut off, and the key latch 15 is forced by spring 29 to enter the slot 28 in the key 13. The surface of this slot 28 which contacts the inclined surface 22 of the key latch 15 is correspondingly inclined. Accordingly, the upward entering force of the key latch 15 is translated into a lateral force which causes the key 13 to slide against the force of the spring 14, and retract from the hole 10 in the clutch plate 9b, whereby the key guide 12 is uncoupled from the clutch plate 9b. In the above described manner, the clutch shaft 11 rotates through one revolution only when a guide roll 25 contacts the trip lever 26.

The other sections or components of the embodiment will now be described in order.

*Horizontal conveyor drive (FIG. 6)*

The clutch shaft 11 is provided at one end with a crank 29, the crankpin of which is connected by a connecting plate 30 to one arm of a pawl lever 31, which, at its other end, pivotally supports a pawl 32 adapted to engage and operate cooperatively with a ratchet wheel 33. The ratchet wheel 33 is fixed to lattice shaft (conveyor drive shaft) 34. Thus, the rotational driving motion of the clutch shaft 11 is translated into an oscillating motion of the pawl lever 31 and is then translated by the pawl 32 and ratchet wheel 33 into an intermittent rotational motion of the lattice shaft 34, whereby the horizontal conveyor is caused, by way of sprocket wheels fixed to the shaft 34 and endless chains 4 trained over these sprocket wheels, to undergo intermittent conveying motion. The endless chains 4 are maintained at a suitable tension by tensioning devices 35, one of which is shown in FIG. 3.

*Chute plate section (FIGS. 3 and 6)*

In general, when an excessive number of bobbins collect on the chute plate, the bobbins tend to rub against each other, and thread entanglement occurs, whereby the bobbins may fail to be moved to the elevating conveyor. In order to prevent this defective operation, the present feeder is provided with a controller for regulating the weight of the bobbins at the chute plate section, the controller having the following construction.

A chute plate 36 is disposed at the discharge end of the horizontal conveyor to receive the bobbins discharged by the horizontal conveyor and rolling thereon by gravity. The chute plate 36 is fixed to a horizontal shaft 37 which is supported rotatably by bearings on the side frames 1 and 2 of the horizontal conveyor. To one end of this shaft 37 is fixed a lever 38, one arm of which is caused to contact a fixed pin 39 by a spring 40, and the other arm of which is connected by a connecting link 41 to one end of a shifter plate 42. The other end of the shifter plate 42 is adapted to engage a pin 43 fixed to the upper part of the pawl 32.

Figure 6:
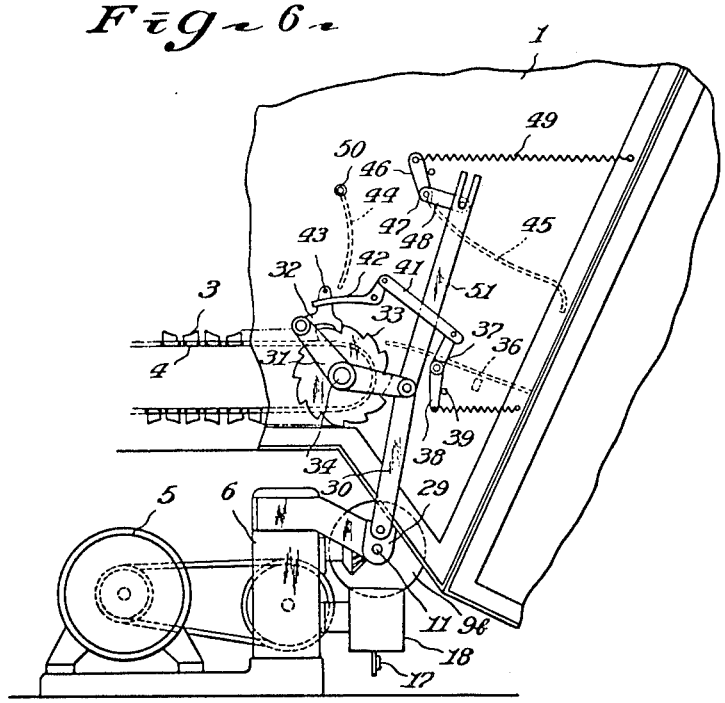
FIG. 6 is a side elevational view, with parts cut away, showing the details of one portion of the conveyor of FIG. 5.

The foregoing controlling system is so designed that when the weight of the bobbins accumulated on the chute plate 36 exceeds a predetermined value it overcomes the force of the spring 40, whereby the chute plate 36 is tipped, in the clockwise direction as viewed in FIG. 6, and this movement is transmitted by the system to cause the shifter plate 42 to engage the pin 43 and force it upward, thereby causing the pawl 32 to disengage from the ratchet wheel 33. Consequently, the conveying operation of the horizontal conveyor is stopped. When the excessive bobbins on the chute plate 36 are moved away by the elevating conveyor, the chute plate 36 is restored to its original position by the force of the spring 40, and at the same time, the pawl 32 is released and engages the ratchet wheel 33, thereby causing resumption of the operation of the horizontal conveyor.

*Bobbin regulating device (FIGS. 6 and 11)*

Since the bobbins are caused to roll from the horizontal conveyor onto the chute plate 36 by gravitational force, the orderly side-by-side arrangement of the bobbins is sometimes disturbed. If a bobbin B on the chute plate 36 is turned so that its axis is coincident with the direction of travel, it will not board a slat 52 of the elevating conveyor. Therefore, in order to correct any tendency of the bobbins to turn lengthwise to the direction of travel, a separator 44 (FIG. 6) made from a material such as thin rubber sheet or steel sheet is suspended from a shaft 50 rotatably supported by the side frames 1 and 2.

Since when the bobbin is caused to drop onto the chute plate, the bobbin is always caused to roll while being contacted with the separator 44, and the succeeding bobbin, the separator 44 becomes a guide and brake member for such rolling whereby the adjoining bobbins are regularly conveyed in the horizontal of their axes and of being contacted with one another.

In addition, as shown in FIGS. 6 and 10, a movable flapper 45, which is fixed to a shaft 47 rotatably supported by the side frames 1 and 2, is suitably positioned with respect to the chute plate 36. The flapper 45 is caused to undergo up and down motion by power transmitted from the pawl lever 31 by a mechanism consisting of an operating plate 51 and a lever 48 fixed to one end of the aforesaid shaft 47. As shown in FIG. 11, when the bobbin B leans vertically onto a slat 52 of the elevating conveyor, the bobbin, when the flapper 45 lowers, is brought down by the flapper. On the other hand, if two bobbins are leaning on one slat 52 by the entanglement of one bobbin with the other thread end, one of the bobbins will be dropped off by the flapper 45 when the flapper lowers.

*Elevating conveyor (FIG. 10)*

The essential parts of the elevating conveyor are the plurality of slats 52, endless chains 53 to which the ends of the slats 52 are connected, and sprockets 54 and 56 over which the endless chains 53 are trained. The endless chains 53 are maintained at a suitable tension by tensioning devices 55. The sprockets 54 are fixed to a sprocket shaft 57 and rotate together with a ratchet wheel 58 which is also fixed to the same shaft 57, and which is driven by a pawl 59. The pawl 59 is driven by the clutch shaft 11 through a known type of linkage.

The bobbins alined in order on the chute plate 36 are picked up one by one and conveyed by the slats 52. As the clutch shaft 11 rotates through one revolution, its motion is transmitted through the above said linkage, the pawl 59, the ratchet wheel 58, the sprockets 54, and chains 53 to advance the slats 52 by one pitch, that is, the spacing of the slats, whereby one bobbin is caused to drop from the upper parts of the conveyor, under the guidance of a guide plate 61, into an elevating conveyor chute 60. One of the side members of the chute 60 is defined by an inclined and curved surface as shown in FIG. 10A and the bobbin B in the chute is displaced from a horizontal direction to a vertical direction by means of such surface thus packing the bobbins into a magazine can 62.

*Spare bobbin box (FIG. 10)*

The elevating conveyor is provided with a spare bobbin box 63, fixed to a stationary part of the conveyor and positioned to face the slats at an intermediate point of their effective conveying path, and a swing plate 64 is connected to the bobbin box 63 by a hinge 65. Spare bobbins are placed in this spare bobbin box. If a bobbin fails to board its corresponding slat 52, one of the winding units of the automatic winder will not be supplied with a bobbin. When each of the slats 52 is carrying a bobbin, the swing plate 64 is supported by the bobbins as indicated in FIG. 10, and the bobbins in the spare bobbin box are held therein, but if a slat is empty, the plate 64 will swing down to the position of such empty slat and permit a spare bobbin to drop by gravity into the slat. Thus, each of the slats 52 is always caused to carry a bobbin.

*Unwound thread cutter (FIGS. 36, 37, and 38)*

As described hereinbefore, the bobbins are conveyed, one bobbin to a slat 52, on the elevating conveyor. Frequently, however, the thread ends of these bobbins become unwound and, as shown in FIG. 36, extend over onto an adjacent slat, whereby the bobbins are caused to fall off their slats, or the withdrawal of their thread ends becomes defective.

In order to eliminate the above difficulty, the present elevating conveyor is provided with means for cutting the thread ends extending over onto adjacent slats as described above.

Referring to FIG. 37, a sprocket 200 is fixed to one end of the clutch shaft 11 and, by way of an endless chain 203, drives a sprocket 202 fixed to a shaft 201 which is rotatably supported at an intermediate part of the elevating conveyor. A cam 204 is also fixed to the same shaft 201 and actuates a lever 205.

The power transmitted from the clutch shaft 11 to the cam 204 is further transmitted through a mechanism comprising the lever 205, a connecting rod 206, and a swing lever 207 to cause a sliding piece 208 connected to the end of the lever 207 to undergo a sliding, reciprocating motion along a guide bar 209. A spring 210 (FIG. 38) imparts a force tending to maintain the lever 205 pressed against the cam 204. One part 211 of the sliding piece 208 is in the form of knife which is caused by the reciprocating motion of the sliding piece 208 to cut any loose thread ends which extends over onto adjacent slats.

The sprockets 200 and 202 are provided with the same number of teeth so as to cause the above described reciprocating motion of the knife to take place during each pause in the movement of the slats, and to cause the slats to move by one pitch after the sliding piece 208 has returned fully to its retracted, inactive position.

*Suction device for last-wound thread (FIGS. 1, 3, 12, 13, 14, 39, and 40)*

The finally wound part of the thread of a bobbin is wound spirally several times from the tip of the bobbin to its tail portion as shown in FIG. 1. When this last wound part of the thread is to be unwound by hand, the thread end is grasped and pulled in the axial direction of the bobbin (downward in FIG. 1) so as to unwind this part of the thread.

In the instant feeder, this operation is accomplished by means of an air current. Accordingly, a suction nozzle is caused to encompass the tail end portion of the bobbin to unwind the last-wound thread, and the thread is cut by means of scissors. This operation is accomplished by a suction device which is positioned on the elevating conveyor as shown in FIG. 3.

Referring to FIG. 12, a bobbin B is held stationary by a holding plate 66 under a force imparted by springs 67. At this time, a suction nozzle 49, connected at its rear end to a suction blower (not shown), advances up to the tail end of the bobbin, draws in the last-wound thread, and retracts, whereupon the drawn-in thread end is cut by scissors 68. This automatic operation is accomplished by the following mechanism.

Driving power is taken off from the clutch shaft 11 through a sprocket 74 (FIG. 3) fixed thereto, and endless chain 71 (FIGS. 3 and 4), and a driven sprocket 70 having the same number of teeth as the sprocket 74, whereby the timing of the sprocket 70 is synchronized with that of the slats 52 of the elevating conveyor, and one revolution of the clutch shaft 11 causes one revolution of the sprocket 70. The sprocket 70 is fixed to a cam shaft 69, to which are also fixed a nozzle cam 72 and a scissors cam 73. The nozzle 49 is caused to undergo forward and rearward sliding motion by driving power transmitted thereto from the nozzle cam 72 through a cam roll 75, and a sector gear 76. The scissors 68 is operated by driving power transmitted from the scissors cam 73 through a cam lever 73a and a connecting rod to actuate a cutting blade lever 68b of the scissors 68.

The forward end of the nozzle 49 is provided with a vortex jet device, as shown in FIGS. 39 and 40, which during the operation of the nozzle 49 creates a vortex spiral flow of air about the tail portion of the bobbin, unwinding the last-wound thread in a direction opposite to its winding direction, and thereby greatly improves the efficiency of the thread suction operation.

The above-mentioned vortax jet device comprises an air chamber 221 encompassing the outside of the forward end of the nozzle 49 and a plurality of jet orifices 220 so formed in the wall of the nozzle 49 as to direct the air in the air chamber 221 as a plurality of circumferentially equally-spaced air jets in tangential directions with respect to the bobbin, as viewed in cross section and in a slightly rearward direction as viewed in longitudinal section of the nozzle 49. Compressed air is supplied to the air chamber 221 by an air compressor (not shown) through a flexible pipe 222.

*Thread withdrawing mechanism*
*(FIGS. 15, 16, 17, 18, and 19)*

The bobbins which have been dropped from the elevating conveyor into the magazine at the bobbin supply station are conveyed intermittently by the magazine cans 62 successively to a plurality of thread end operating stations, a thread end searching station, a thread end cutting station and a thread end finding station. FIGS. 15 and 18 are front elevational views of a bobbin prior to and at these stations. The magazine can 62 is carrying this bobbin to the right as viewed in FIG. 19.

The thread end operating mechanisms comprise a searching mechanism, a cutter mechanism, and a thread end finding suction nozzle assembly alined in the order named. In the thread end finding suction nozzle section, a beater 141 is installed to function as an auxiliary device for thread withdrawal.

A bobbin which, in the suction device for last-wound thread, has had its thread end freed appears as shown in FIG. 15. At the searcher section, the thread end is wound loosely about the bobbin surface as indicated in FIG. 16. At the cutter section, the thread end is freed, then is drawn in by the suction nozzle 131. The directions of rotation of the bobbin during these operational steps are as indicated by the arrows in FIGS. 16, 17, and 18.

In the case wherein the thread has not been unwound in the suction device for the last-wound thread, and the thread end is buried within the bobbin wound layers or is engaged with the first wound thread (FIG. 1), the thread is cut at the doffing coil part by the searcher. Then, at the cutter section, the last-wound thread at the lower end is drawn in (FIG. 22). At the thread end suction nozzle section, the thread end is drawn in, and the thread is led into a magazine pipe for delivery to the thread uniting knotter.

Figure 24:
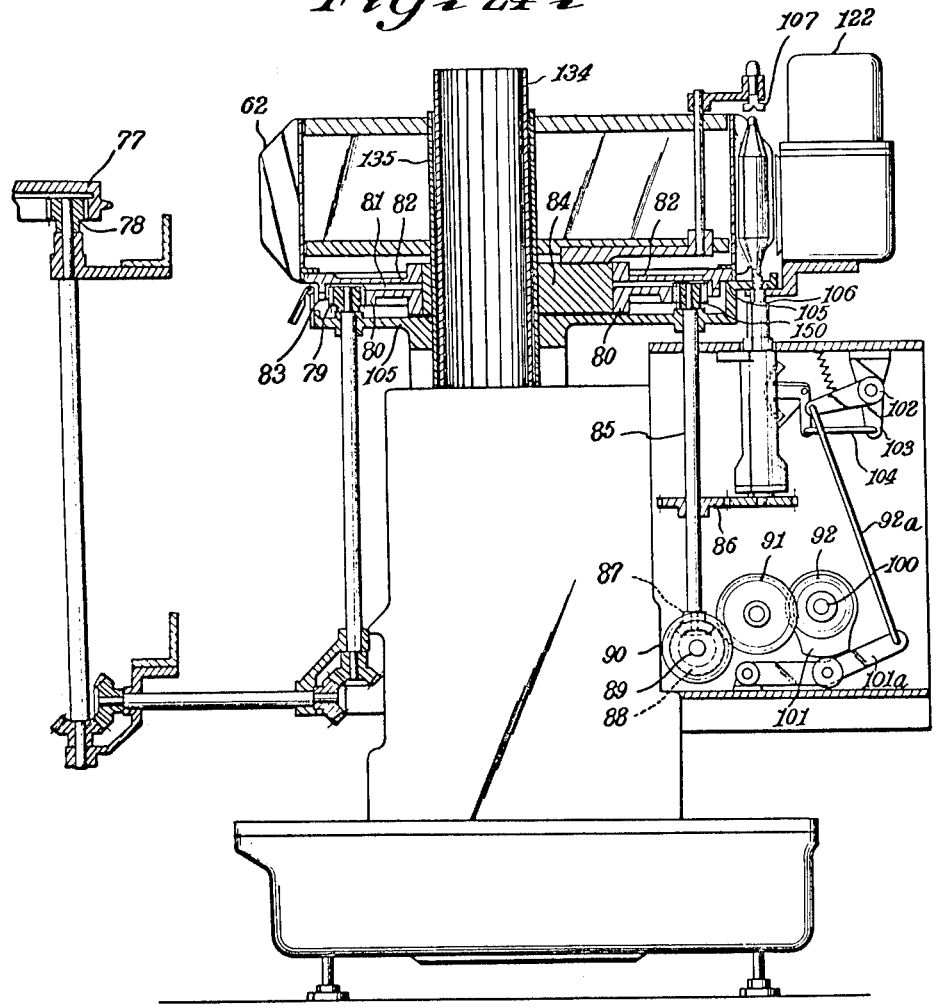
FIG. 24 is a side elevational view, with parts cut away and some parts in section, showing one portion of the magazine section of the embodiment of the present invention.

*Magazine drive method (FIG. 24)*

The method of driving the magazine cans in the instant feeder is the same as that of the known Abbott type automatic winder. Internal gear teeth are cut on the inner surface of a sprocket 77 driving the winding units, and power is transmitted thereby through a sprocket pinion 78 and bevel gears to maintain a magazine pinion 79 and a ring gear 80 always in rotation. The magazine cans 62 are attached to a magazine disk 82, between which and the ring gear 80 a friction washer 81 is interposed, with the entire assembly of these parts being adapted to be rotatable about a guide ring 84. The magazine disk 82 is provided with stoppers 83 which are of the same number as the magazine cans and are equally spaced on a common circle, whereby the rotation of the aforesaid assembly is stopped by a stopper 83 in accordance with the advance of a winding unit. When a stopper 83 is released, the assembly rotates by one pitch, that is, one pitch or regular spacing between adjacent magazine cans.

*Spindle drive (FIGS. 24, 25, and 26)*

The spindles of the thread end operating mechanisms are driven by the following system.

The aforementioned ring gear 80 meshes with a pinion 150 which is fixed to the upper end of a vertical shaft 85. A spur gear 86 is fixed to the vertical shaft 85 near its middle part and drives a gear train whereby spindles 106, 106a, and 106b are successively driven.

The vertical up and down movement in a direction along the axis of each spindle and bobbin thereon is controllably effected by a mechanism of the following description. From the lower end of the vertical shaft 85, power is transmitted through bevel gears 87 and 88, a shaft 89, spur gear 90 fixed to the shaft 89, and an idler gear 91 to maintain in constant rotation a clutch plate 92 fixed to a common hub with a spur gear in mesh with the idler gear 91.

The trip lever 26 is so disposed that when it is tripped by a guide roll 25 of a winding unit, the movement is transmitted through a linkage and slide mechanism 93 through 97, inclusive, to cause the extraction of a key latch 98 of a clutch mechanism which consists of clutch plate 92 supported in a freely rotatable manner on a cam shaft 100 and a key guide 99 keyed to the cam shaft 100, and which is similar to the afore-described clutch mechanism in the driving system of the elevating conveyor. Accordingly, in the same manner as in the elevating conveyor drive, the key guide 99 is coupled by a key to the clutch plate 92, and the cam shaft 100 is rotated through one revolution. At the same time as above, the microswitch 27 operates the trip lever 26 thus actuating solenoid 18 whereby as described above, the bobbin on the slat 52 is charged into the magazine 62. The position of the fulcrum of the trip lever 26 is so determined that the above-mentioned operation is effecting during the stationary state of the magazine. As abovementioned, the magazine is intermittently rotated.

A cam 101 is fixed to the cam shaft 100 and actuates a follower lever 101a, the movement of which is transmitted through a connecting rod 92a and a crank lever to cause rotation of a shifter shaft 102 which is a part of a mechanism positioned beside the spindle assembly and comprises an operating lever 103 fixed to the shifter shaft 102, a connecting plate 104, and sector gear 113 in mesh with a rack on a sleeve 112 of the spindle 106. The movement of the shifter shaft 102 is transmitted through this mechanism to effect up and down movement of the spindle.

*Spindle (FIGS. 24, 26)*

In the thread end operating mechanisms, each bobbin is subjected, as it is rotated, to the operations of a searcher, a cutter, a suction nozzle, and a beater. The bobbin, supported by a magazine can 62, travels over a magazine table 105 and stops successively at each spindle section, for example, the section directly above the spindle 106. The spindle 106 is then raised in the manner described above, its upper portion passing upward through a hole provided in the magazine table 105, and its tapered tip is inserted firmly into the lower bore of the bobbin, whereby the bobbin is securely held between the spindle 106 and a top spindle 107 and is rotated.

As shown in FIG. 26, the power obtained from the spur gear 86 is transmitted through spur gears 108 and 109, by which the rotational speed is suitably increased, to drive a bushing 110 which, through a Woodruff key 111 transmits driving power to the spindle 106. The spindle 106 is thus caused to rotate with the sleeve 112 as a bearing. As mentioned hereinbefore, the sleeve 112 has a rack which is in mesh with the sector gear 113, and the sleeve 112, together with the spindle 106, is moved up and down in accordance with the movement of the shifter shaft 102. A tension spring 114 is adapted to impart a tension force on the end of the operating lever 103 fixed to the shifter shaft 102, whereby the raising of the spindle 106 is accomplished by the force of the spring 114, and lowering the spindle 106 is accomplished compulsorily, against the force of the spring 114, by the operation of the cam 101, whereby the safety of the spindle mechanism is assured.

*Searcher (FIGS. 27A and 27B)*

The bobbin is rotated by the spindle 106 in the direction in which its thread has been wound. The configuration of the cam 101 is so determined as to cause the bobbin to gradually rise as it rotates. The movement of a searcher 115 is motivated by power from the cam shaft 100 (FIG. 25) and so controlled independently by a cam that its searcher knives 115a are operated only during the above mentioned rising of the bobbin. When a connecting rod 120 is pulled toward the right (as viewed in FIG. 27A) by a cam (not shown), this movement is transmitted through a release lever 119 and a release rod 118 to cause an upright shaft 116 to rotate, and release arms 117 which are set on this upright shaft 116 rotate, thereby permitting springs 121 to force the searcher assembly 115 to advance and contact the bobbin surface.

The searcher assembly 115 is provided with searcher guides 115b which have tips of arcuate shape so as to closely conform to the diameter of the bobbin. These searcher guides 115b, together with the searcher knives 115a, are so adapted that, even when irregularities in the bobbin wound diameter are present, a searcher knife 115a positively catches the doffing coil and at the same time, is prevented from biting into the bobbin winding layers and cutting unnecessary thread.

It has been found that it is necessary that the radius of the arcuate tips of the searcher guides 115b be slightly larger than the radius of the bobbin surface, and that these searcher guides may be flat plates. Moreover, since the time during which the searcher operates is only that during which the spindle is rising, as was described above, the searcher is adapted to disengage, even if it should bite into the bobbin winding layers, and to pick up only the doffing coil part in a positive manner without damaging the thread end of the bobbin.

*Cutter (FIG. 28)*

In the cutter section, the bobbin is rotated by the spindle 106a in the direction in which its thread has been wound, and the lower half, last-wound thread which has been cut in the searcher section is drawn away. If the wind up operation is carried out with the last-wound thread still remaining, the frequency of thread breaks back in the winding will increase because of the restraining action of the last-wound thread during winding. Moreover, pieces of thread waste will be wound up in the package and cause trouble in the subsequent processes.

As shown in FIG. 28, the cutter assembly comprises essentially a rotary cutter 127 with spirally formed cutting edges, a stationary cutting blade 128 cooperating with the cutter 127, a motor 122 supplying mechanical power for the cutter, a speed-reduction gear train 123, 124, 125, and 126 for transmitting the power from the motor 122 to the cutter 127, and a suction nozzle 129. The pieces of waste thread drawn in by the nozzle 129 are cut by the cooperative action of the cutter 127 and the blade 128 so as to prevent the drawing out of a last-wound thread from the bobbin and to insure that there will be no entanglement of the true thread end and waste thread at the suction nozzle section.

Also, in the case when the first winding thread has been left in a long condition, it is cut by this cutter. As shown in FIG. 28, an opening 130 is provided in the side of the cutter housing and is connected to a suction blower (not shown) so as to draw in the last-wound thread.

*Suction nozzle thread end finder (FIGS. 30, 31, 32, 33)*

In the suction nozzle thread end finding section, as shown in FIG. 30, each bobbin B is positioned on a spindle 106b and is closely confronted by a suction nozzle 131 which is connected to a suction box 136 through a pipe line consisting of a suction pipe 132, a Y-shaped pipe 133, and an inner magazine pipe 134. Suction for this system is supplied by a suction blower (not shown). When the bobbin B is rotated by the spindle 106b in the direction of unwinding, the thread which is unwound by the rotation is conducted successively through the nozzle 131 and the pipe line 132, 133, and 134 into the suction box 136.

A narrow slit is cut along the inner side of the suction nozzle 131, suction pipe 132, and Y-shape pipe 133 as shown in FIG. 31. When the rotation of the bobbin stops, the thread which has been led through this pipe line by air flow passes through this narrow slit and is guided to the outer part of the inner magazine pipe 134, assuming a straight-line disposition as indicated by reference letter Y from the bobbin B to the upper surface of an outer magazine pipe 135.

The inner magazine pipe 134 has a cutout which starts at a part A on the upper rim (FIG. 30) and is alined with the slit of the Y-shaped pipe 133 at the joint between the pipes 133 and 134. This cutout expands in width from top to bottom so as to prevent clogging of threads when several threads are passed therethrough. The path of this cutout is also made helical from top to bottom in the direction of rotational travel of the magazine. Through this cutout, the thread is guided from the interior of the inner magazine pipe 134 to the space between the inner and outer magazine pipes, and knotter miss due to lagging of the outer magazine pipe side of the thread Y guided in accordance with the rotational travel of the magazine cans is prevented. (FIG. 33.)

*Beater (FIGS. 34, 35)*

When the thread end of a bobbin is buried within the wound layers, or when the thread has much fluff, it is difficult to withdraw the thread end merely by air flow. Therefore, a beater having a beater roll 141 made of rubber or leather is installed in the vicinity of the suction nozzle 131 so as to beat the surface of the bobbin.

If this beater is operated to beat the bobbin not only while the bobbin is rotating on the spindle 106b but also when it is travelling together with a magazine can, the bobbin surface will be beaten more than necessary, whereby its outer threads will be damaged, and the thread led into the magazine pipe may even be cut. Therefore, the beater of the instant feeder is provided with a mechanism as described below which causes the beater to operate on the bobbin only when the bobbin is rotating and to move away from the bobbin when the bobbin stops rotating and moves together with its magazine can.

Referring to FIG. 34, the beater consists essentially of a beater 141, a beater shaft 140 driven by a motor 160 through a gear train comprising gears 161, 137, 138, and 139, a vertical stationary shaft 144, and a beater bracket 143 rotatably supported on the stationary shaft 144 and rotatably supporting the beater shaft 140 as well as the shaft of the gear 138. It will be apparent that rotation of the beater bracket 143 about the stationary shaft 144 causes shifting of the position of the beater 141 without disengagement of the gears. A shield collar 142 is provided about the beater shaft 140, directly above the beater bracket 143 so as to prevent thread from becoming wound about the bearing part of the beater bracket 143. This rotation of the beater bracket 143 is accomplished by the following mechanism, which is illustrated in FIG. 35.

Periodic driving power is taken off the shifter shaft 102 through a linkage consisting of an operating lever 170, a connecting plate 171, a bell crank 172, a connecting rod 173, and an arm on the beater bracket 143 to rotate the beater bracket and, therefore, the beater 141. By this construction, the beater 141 is moved into operational contact with the bobbin when the shifter shaft 102 rotates to raise the spindle 106b to cause the bobbin to rotate as above described, and the beater 141 is swung away from the bobbin when the shifter shaft 102 rotates in the opposite direction to lower the spindle 106b, and the rotation of the bobbin stops.

Although this invention has been described with respect to a particular embodiment thereof, it is not to be so limited as changes and modifications may be made therein which are within the full intended scope of the invention as defined by the appended claims.

What is claimed is:

1. In combination with a bobbin rewinding apparatus having
   a plurality of winding mechanisms for unwinding thread from bobbins and winding it onto packages at each of said winding mechanisms,
   bobbin replenishment means movable relatively to said winding mechanism for replenishing at a transfer station a wound bobbin onto a winding mechanism from which a bobbin has been removed,
   thread uniting means uniting a thread from a package at a said winding mechanism from which a bobbin has been removed to a thread from a wound bobbin on said bobbin replenishment means and
   package thread delivery means for delivering to said thread uniting means a package thread free end,
   that improvement which consists of:
   wound bobbin thread end operating means remote from said transfer station for removing a free end of thread from a wound bobbin,
   means for delivering said free end from said bobbin thread end operating means to said thread uniting means,
   means for moving a wound bobbin from adjacent said bobbin thread end operating means to said bobbin transfer station and
   means for delivering wound bobbins in succession to said wound bobbin thread end operating means.

2. Apparatus as claimed in claim 1 in which said wound bobbin thread end operating means includes suction means for the thread wound about the lower end of a bobbin, means for advancing and retracting said suction means relative to the lower end of each bobbin, and cutting means for said thread.

3. Apparatus as claimed in claim 1 in which said wound bobbin thread end operating means includes a searcher, means mounting the searcher for movement toward and away from a bobbin, a suction conduit for drawing the thread wound about the lower end of a bobbin and cutting means therefor.

4. Apparatus as claimed in claim 1 in which said wound bobbin thread end operating means includes a rotatable beater movable toward and away from a bobbin within the magazine and a suction nozzle cooperable therewith.

5. Apparatus as claimed in claim 4 in which said wound bobbin thread operating means further includes means for rotating a wound bobbin about its axis for contact by the rotatable beater of the entire periphery of an upper portion thereof.

6. Apparatus as claimed in claim 1 wherein said means for delivering wound bobbins in succession to said wound bobbin thread end operating means includes
   movable full bobbin supplying means and
   conveying means for conveying full bobbins to said wound bobbin thread end operating means.

7. Apparatus as claimed in claim 6 in which said bobbin supplying means includes a plurality of horizontally disposed cross bars having concave surfaces for aligning the bobbins transversely to the direction of movement of the supplying means, separator means adjacent the supplying means and conveying means for positioning the bobbins in side by side alignment, said conveying means including a plurality of slats with each slat being adapted to contain a bobbin, means cooperable with the conveying means for imparting intermittent movement to said slats in unison with said magazine so that at each intermittent movement of travel one bobbin is deposited into the magazine, a pivoted chute between said cross bars and slats, and control means operably connected with said chute and bobbin supply means operative when an excessive number of bobbins are on the chute to arrest the movement of the supply means.

8. In combination with a bobbin rewinding apparatus having
   a plurality of winding mechanisms for unwinding thread from bobbins and winding it onto packages at each of said winding mechanisms,
   a bobbin transfer station,
   a rotary bobbin supply magazine supporting a plurality of angularly spaced wound bobbins for movement along a circular path to said bobbin transfer station for supplying a wound bobbin to a winding mechanism from which a bobbin has been removed,
   thread uniting means adjacent said transfer station for uniting a thread from a package at a said winding mechanism to a thread from a wound bobbin on said rotary bobbin supply magazine, and
   package thread delivery means for delivering to said thread uniting means a package thread free end found by said package thread finding means,
   that improvement which consists of:
   wound bobbin thread end operating means at a thread end operating station angularly spaced from and remote from said transfer station for removing a free end of thread from a wound bobbin for delivery of said free end to said thread uniting means,
   wound bobbin thread delivery means for delivering to said thread uniting means a wound bobbin thread end removed by said wound bobbin thread end operating means,
   means for delivering wound bobbins to said thread end operating station, and
   power means for rotating said bobbin supply magazine sequentially to advance full bobbins from said thread end operating station to said transfer station for transfer of a wound bobbin to a winding mechanism from which a bobbin has been removed and uniting its thread end with that of a package at said station for unwinding of thread from said bobbin onto said package by said mechanism.

9. Apparatus as claimed in claim 8 wherein said thread end operating means includes
   searching means at a searching station,
   cutting means at a cutting station and
   thread finding means at a thread finding station
   all angularly spaced from one another.

10. Apparatus as claimed in claim 9 wherein said searching means includes
    means for rotating a bobbin about its axis,
    means for moving a bobbin in an axial direction and
    searcher means operable to engage and cut a thread portion wound on a bobbin.

11. Apparatus as claimed in claim 9 wherein said cutting means includes
    means for rotating a bobbin about its axis to unwind the end portion of thread thereon and
    suction means to draw said end portion of thread from said bobbin and a cutting mechanism to cut free said end portion.

12. Apparatus as claimed in claim 9, wherein said thread finding means includes
   means for rotating a bobbin about its axis,
   a rotatable beater for beating a bobbin to free a thread end and
   suction means for removing said thread end for delivery to said uniting means.

13. In combination with a bobbin rewinding apparatus having
   a plurality of winding mechanisms for unwinding thread from bobbins and winding it onto packages at each of said winding mechanisms, and package thread finding means,
   a bobbin transfer station,
   a rotary bobbin supply magazine having a plurality of bobbin positions supporting a plurality of angularly spaced wound bobbins for movement along a circular path to said bobbin transfer station for supplying a wound bobbin to a winding mechanism from which a bobbin has been removed,
   thread uniting means adjacent said transfer station for uniting a thread from a package on a said winding mechanism to a thread from a wound bobbin on said rotary bobbin supply magazine, and
   package thread delivery means for delivering to said thread uniting means a package thread free end found by said package thread finding means,
   that improvement which consists of:
   a plurality of wound bobbin thread end operating means at a plurality of thread end operating stations including thread end searcher means at a thread end searching station and thread end finding means at thread end finding station angularly spaced from and remote from one another and said transfer station for removing a free end of thread from a wound bobbin for delivery of said free end to said thread uniting means,
   wound bobbin thread delivery means for delivering to said thread uniting means a wound bobbin thread found by said wound bobbin thread finding means,
   means for delivering wound bobbins to said rotary bobbin supply magazine at a bobbin supply station angularly spaced in advance of and remote from said thread operating and transfer stations, and
   power means for rotating said bobbin supply magazine sequentially to advance full bobbins from said supply station to said thread end operating and transfer stations for transfer of a wound bobbin to an empty winding mechanism from which a bobbin has been removed and uniting its thread end with that of a package at said station for unwinding of thread from said bobbin onto said package by said mechanism.

14. Apparatus as claimed in claim 13, wherein
   means are provided for rotating a bobbin about its axis at said searching and finding stations.

15. Apparatus as claimed in claim 14, wherein
   a rotatable beater is provided at said finding station for beating said bobbin to free a thread end therefrom.

16. Apparatus as claimed in claim 15, further including
   a thread end cutting station located between said searching and finding stations, including means to cut and remove a thread portion wound about the lower end of said bobbin.

17. Apparatus as claimed in claim 13 wherein said means for delivering wound bobbins to said rotary bobbin supply magazine at said bobbin supply station includes
   magazine filling means,
   full bobbin reservoir means and
   conveying means for conveying full bobbins from said reservoir means to said magazine filling means.

18. Apparatus as claimed in claim 17 in which said conveying means for the bobbins includes a plurality of slats with each slat being adapted to contain a bobbin, and means cooperable with the conveying means for imparting intermittent movement to said slats in unison with said magazine so that at each intermittent movement of travel one bobbin is deposited into the magazine.

19. Apparatus as claimed in claim 17 in which said bobbin supplying means includes a plurality of horizontally disposed cross bars having concave surfaces for aligning the bobbins transversely to the direction of movement of the supplying means, and separator means adjacent said supplying means and conveying means for positioning the bobbins in side by side alignment.

20. Apparatus as claimed in claim 17 in which said conveying means for the bobbins includes a plurality of slats with each slat being adapted to contain a bobbin, means cooperable with the conveying means for imparting intermittent movement to said slats in unison with said magazine so that at each intermittent movement of travel one bobbin is deposited into the magazine, a spare bobbin box located in the area of the travel path of the slats, and a pivoted plate for the box normally providing a door and operative when an empty slat passes said plate to move about its pivot for allowing a bobbin in the box to roll along the plate onto the empty slat.

21. Apparatus as claimed in claim 17 wherein said conveying means includes
   spare bobbin means positioned between said magazine filling means and said full bobbin reservoir means and responsive to the absence of a bobbin on said conveying means to supply said bobbin to said conveying means.

22. Apparatus as claimed in claim 17 wherein said conveyor means is advanced in synchronism with said bobbin supply magazine to supply full bobbins to said magazine filling means for supplying a full bobbin at each of said bobbin filling positions.

23. In an automatic feeder for an automatic winder of an Abbott type including plural winding units, a circular track along which the winding units are circulated while winding, knotter means for executing automatic thread knotting provided at a portion of said circular track, and an intermittently rotating magazine circularly arranged at a portion of said circular track for feeding bobbins onto the winding units, the improvement comprising a first means for depositing bobbins into the magazine, a movable bobbin supplying means, a conveying means for the bobbins located between and connecting the first means and the bobbin supplying means, a suction pipe, and a series of mechanisms located along a path around said magazine for withdrawing the thread ends of the bobbins and moving such thread ends into the suction pipe.

References Cited by the Examiner

UNITED STATES PATENTS

| | | | |
|---|---|---|---|
| 2,177,763 | 10/1939 | Abbott et al. | 242—35.6 |
| 2,675,971 | 4/1954 | Abbott | 242—35.6 |
| 2,747,806 | 5/1956 | Borchardt | 242—35.5 X |
| 2,769,598 | 11/1956 | Drake et al. | 242—35.5 |

MERVIN STEIN, *Primary Examiner.*

STANLEY N. GILREATH, *Examiner.*